United States Patent
Hennessey

(10) Patent No.: US 9,330,646 B2
(45) Date of Patent: May 3, 2016

(54) SUPPORT STAND

(71) Applicant: The Music People, Inc., Berlin, CT (US)

(72) Inventor: James R. Hennessey, West Hartford, CT (US)

(73) Assignee: The Music People, Inc., Berlin, CT (US)

( * ) Notice: Subject to any disclaimer, the term of this patent is extended or adjusted under 35 U.S.C. 154(b) by 0 days.

(21) Appl. No.: 14/161,429

(22) Filed: Jan. 22, 2014

(65) Prior Publication Data

US 2014/0203158 A1 Jul. 24, 2014

Related U.S. Application Data

(60) Provisional application No. 61/755,122, filed on Jan. 22, 2013.

(51) Int. Cl.
| | |
|---|---|
| *F16M 11/24* | (2006.01) |
| *F16M 11/32* | (2006.01) |
| *G10G 5/00* | (2006.01) |
| *F16M 11/38* | (2006.01) |
| *G10D 1/00* | (2006.01) |
| *F16M 11/16* | (2006.01) |

(52) U.S. Cl.
CPC .............. *G10G 5/00* (2013.01); *F16M 11/38* (2013.01); *G10D 1/00* (2013.01); *F16M 11/16* (2013.01); *F16M 11/24* (2013.01); *F16M 2200/024* (2013.01)

(58) Field of Classification Search
CPC ......... G10G 5/00; F16M 11/16; F16M 11/24; F16M 11/38; F16M 2200/024; F16M 2200/028

USPC .............. 248/239, 443, 177.1, 166, 439, 170, 248/188.6; 84/327, 387 A, 453
See application file for complete search history.

(56) References Cited

U.S. PATENT DOCUMENTS

| | | | | |
|---|---|---|---|---|
| 1,448,171 | A | * | 3/1923 | Waderlow ..................... 248/165 |
| 2,095,490 | A | | 10/1937 | Decker |
| 3,908,945 | A | * | 9/1975 | Shapiro et al. ................ 248/165 |
| 4,407,182 | A | * | 10/1983 | Biasini ............................ 84/453 |
| 4,691,610 | A | * | 9/1987 | Gilbert ............................ 84/327 |

(Continued)

FOREIGN PATENT DOCUMENTS

DE 19851935 C1 * 7/2000

OTHER PUBLICATIONS

XCG-4—Classic Guitar Fret Rest Spec Sheet; Jul. 22, 2011; 1 page.

*Primary Examiner* — Tan Le
(74) *Attorney, Agent, or Firm* — Whitmyer IP Group LLC

(57) ABSTRACT

A stand moveable between an open configuration and a closed configuration. A plurality of legs is rotatably coupled to a connector and are rotatable between a closed position, in which each the plurality of legs is substantially parallel, and an open configuration. When the stand is in a closed configuration the plurality of legs are in the closed position and received in a cavity, and the connector is removably secured to the body. When the stand is in an open configuration, the plurality of legs are in the open position and the connector is removably secured to the body such that the plurality of legs are outside of the cavity and such that the body is positioned to receive and support at least a portion of a guitar.

8 Claims, 9 Drawing Sheets

(56) References Cited

U.S. PATENT DOCUMENTS

| | | |
|---|---|---|
| 5,505,413 A | 4/1996 | Hennessey |
| 5,664,756 A * | 9/1997 | Liao .............................. 248/443 |
| 6,007,032 A | 12/1999 | Kuo |
| 6,283,421 B1 | 9/2001 | Eason et al. |
| 6,487,807 B1 | 12/2002 | Kopman et al. |
| 6,666,427 B2 | 12/2003 | Hennessey |
| 6,873,249 B2 | 3/2005 | Chu |
| 7,459,622 B2 * | 12/2008 | Hsieh .......................... 84/387 A |
| 7,584,568 B1 | 9/2009 | Brownlee |
| D688,072 S | 8/2013 | Hennessey |
| 2005/0056739 A1 | 3/2005 | Koning et al. |
| 2011/0167986 A1 | 7/2011 | Hennessey |

\* cited by examiner

SUPPORT STAND

FIELD OF THE INVENTION

The present disclosure relates to a support stand. More specifically, the present disclosure relates to a support stand for a stringed instrument such that is moveable between an open configuration and a closed configuration.

BACKGROUND OF THE INVENTION

A stand is used to support a stringed instrument, for example a guitar or a bass guitar, when the instrument is not being played but ready access is desired, for example in a studio or during a performance. In FIG. 1, an example of a known guitar stand 10, offered under the trademark ON-STAGE®, is shown. The stand 10 includes a base 20 have three legs 22, 24, 26 extending outwardly therefrom for supporting the stand 10. The stand 10 further includes a first support 30 extending outwardly from the base 20. The first support 30 forms a u-shape and is configured to support the body of a guitar in a substantially vertical position. The stand 10 further includes a neck 40 extending upwardly from the base 20 along an axis and receivable in a telescoping fashion in the base 20. A second support 50 is disposed at a distal end of the neck 40. The second support 50 is configured to support a neck of a stringed instrument that is received by the stand 10. The distance between the first support 30 and the second support 50 is between 19.25"-24", depending on how the neck 40 is adjusted.

A disadvantage of known guitar stands, for example the stand 10 shown in FIG. 1, is that they are relatively large and difficult to transport. Typically, it is not possible to store the stand 10 in an instrument case used to store a guitar during transport. This is true even though some stands, for example the stand shown in FIG. 1, can be taken apart. Often times, carrying known guitar stands to a performance requires carrying the guitar in its case with one hand and carrying the guitar stand with the other hand.

Accordingly, there is need for an improved stand that is capable of supporting an instrument, while also being configurable such that the stand can be stored in a small compartment, for example, in a guitar case in which a guitar is also stored.

SUMMARY OF THE INVENTION

The present invention resides in one aspect in a stand moveable between an open configuration and a closed configuration. The stand includes a body extending along an axis AA between a proximal end and a distal end. The body defines a cavity extending through at least a portion thereof. The cavity has an opening near the proximal end of the body. The stand further includes a base having a connector and a plurality of legs extending therefrom. Each of the legs extends between a proximal end and a distal end. The proximal end of each of the plurality of legs is rotatably connected to the connector. The plurality of legs is rotatable between a closed position, in which an axis of each of the plurality of legs is substantially parallel, and an open configuration. When the stand is in a closed configuration the plurality of legs are in the closed position and received in the cavity, and the connector is removably secured to the body. When the stand is in an open configuration, the plurality of legs are in the open position and the connector is removably secured to the body such that the plurality of legs are outside of the cavity and such that the body is positioned to receive and support at least a portion of a guitar.

In some embodiments of the present invention, the plurality of legs comprises a first leg, a second leg, and a third leg, and the plurality of legs form a tripod when the stand is in the open configuration.

In yet further embodiments of the present invention, the first leg includes a first leg support rotatably connected thereto and moveable between an open position and a closed position, and the second leg includes a second leg support rotatably connected thereto and moveable between an open position and a closed position.

In yet another embodiment of the present invention, the first leg support and the second leg support are configured to support at least in part a guitar when the stand is in the open configuration and the first leg support is in the open position and the second leg support is in the open position.

In yet another embodiment of the present invention, the body further includes a body support secured to the distal end of the body. The body support is configured to support a guitar when the stand is in the open configuration.

In yet further embodiments of the present invention, the stand includes a first set of male threads on an outside surface of the connector and a first set of female threads on an inside surface of the cavity. The first set of male threads is engageable with the first set of female threads to removably secure the connector to the body when the stand is in the open configuration. In yet further embodiments the stand includes a second set of male threads on the outside surface of the connector. The second set of male threads is engageable with the first set of female threads to removably secure the connector to the body when the stand is in the closed configuration.

In yet further embodiments of the present invention, the axis AA is between approximately 10 and 20 degrees past a vertical axis DD when the stand is in the open configuration and is resting on a flat surface, the vertical axis DD being perpendicular to the flat surface. In yet further embodiments of the present invention, the body support extends along an axis BB. An axis EE passes through a proximal end of the first leg support and a proximal end of the second leg support. The axis BB is parallel to axis EE when the stand is in the open configuration.

In yet further embodiments of the present invention the stand includes a cap configured to be received on the first set of male threads when the stand is in the closed configuration.

DETAILED DESCRIPTION OF THE INVENTION

Figure 1:
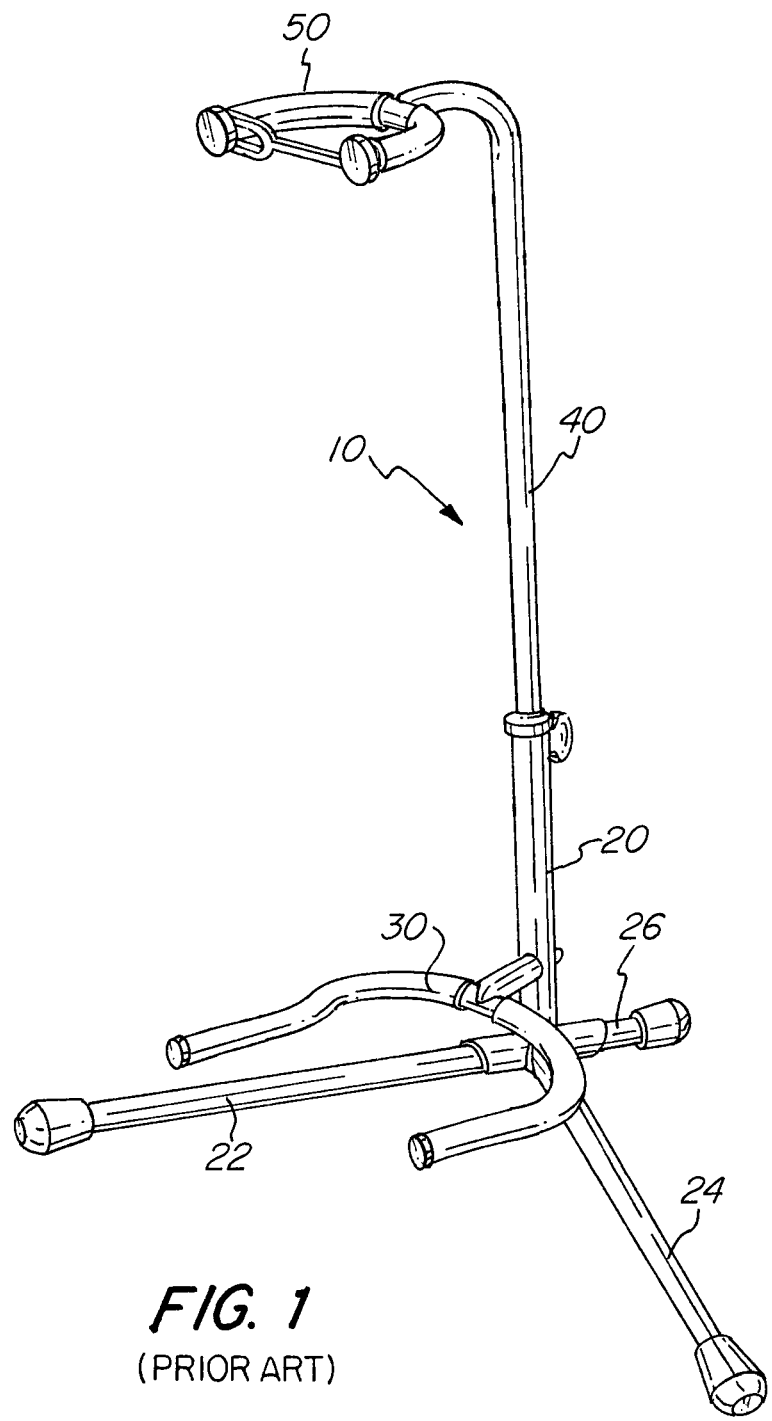
FIG. 1 is a view of a known guitar stand.
Figure 2:
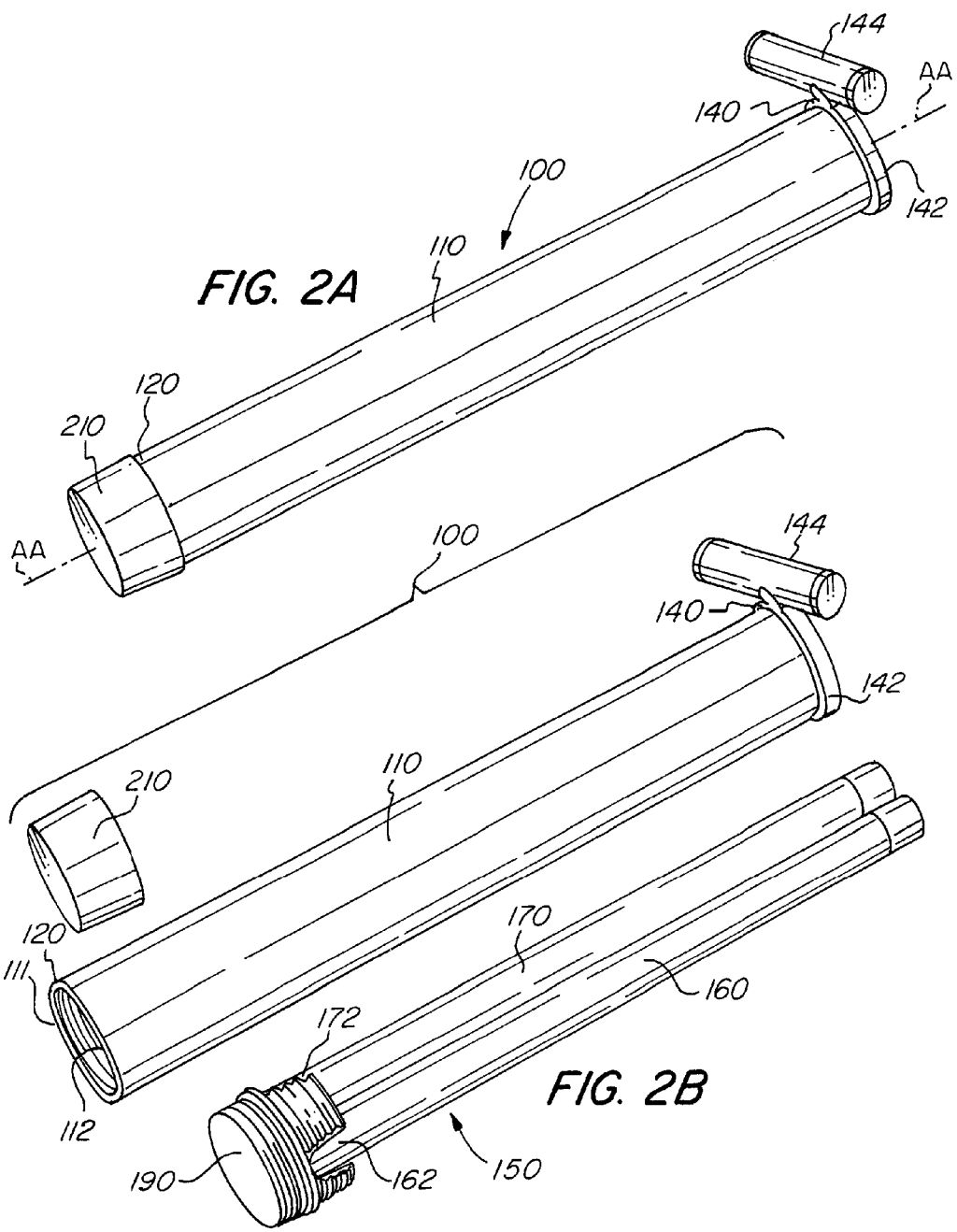
FIG. 2A is a view of a body of a stand in accordance with one embodiment of the present invention, wherein stand is in a closed configuration and the legs of the base are received inside the body.
FIG. 2B is a view of the body and the base of the stand shown in FIG. 2, wherein the base is removed from the body and the legs are in the closed position.
Figure 3:
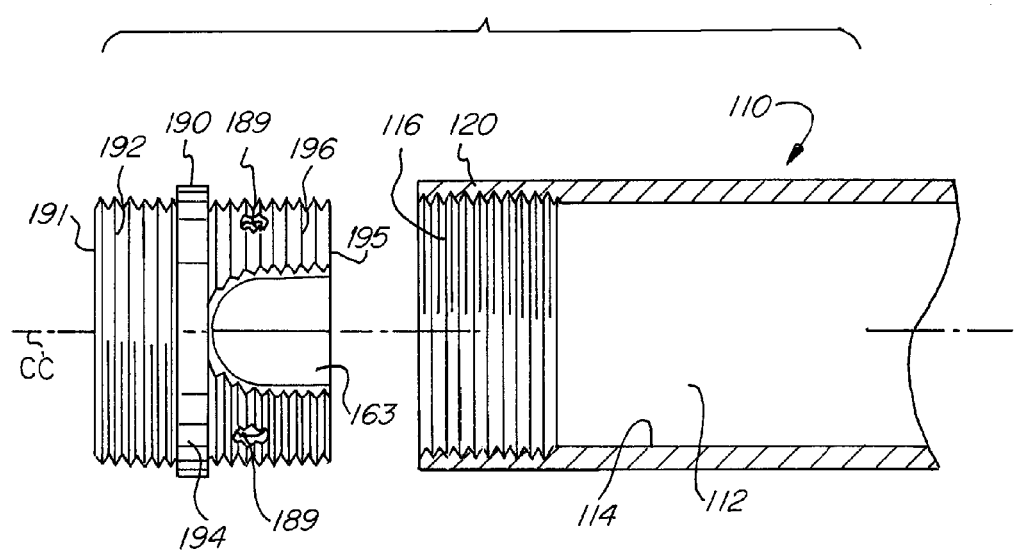
FIG. 3 is an enlarged, partially cross sectional, view of a portion of the body and the base.
Figure 4:
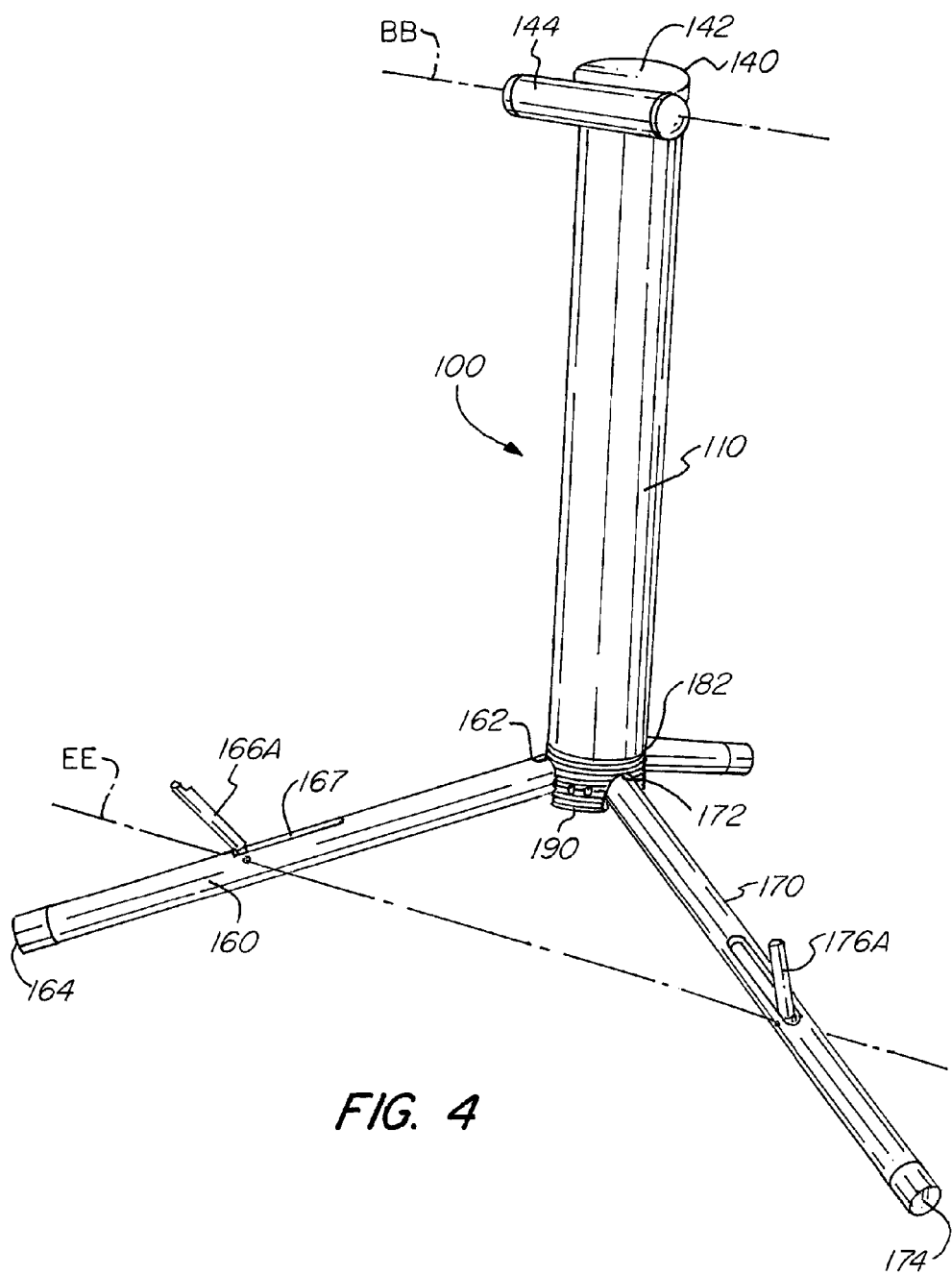
FIG. 4 is a view of the stand shown in FIG. 2A in the open configuration.

In reference to FIGS. 2-9, a stand 100 in accordance with one embodiment of the present invention is shown. The stand 100 includes a body 110 and a base 150. In the disclosed embodiment, the body 110 is generally cylindrical and extends along an axis AA. The body 110 defines a generally cylindrical interior cavity 112 that extends through at least a portion of the body 110 along the axis AA. The base 150 includes a plurality of legs 160, 170, 180 and a connector 190. Each leg 160, 170, 180 is rotatably coupled to the connector 190 at a proximal end 162, 172, 182 of each leg. The legs 160, 170, 180 are rotatable between a closed position, wherein each leg 160, 170, 180 is substantially parallel as shown in FIG. 3A, and an open position, where the legs 160, 170, 180 extend outwardly from the connector 190 and each other as shown in FIG. 4. It should be understood that the legs 160, 170, 180 may be independently rotatable.

The body 110, and more specifically the cavity 112, is configured to receive the legs 160, 170, 180 of the base 150 when the legs 160, 170, 180 are in the closed position. In this manner, the stand 100 can be disassembled and stored in a compact configuration, as shown in FIG. 2. When the stand 100 is in the open configuration, the stand 100 is configured to receive and support a stringed instrument, including but not limited to, an electric guitar, a bass guitar, an acoustic guitar, a violin, a ukulele, a banjo, and a mandolin. It should also be understood, however, to a person having ordinary skill in the art and being familiar with this disclosure that the disclosed stand 100 is not limited for use with a stringed instrument, or instruments generally, and the disclosed stand 100 may be used to support many other types of items.

The body 110 extends along a linear axis AA between a proximal end 120 and a distal end 140. The body 110 is generally cylindrical along the axis AA between its proximal end 120 and its distal end 140. The body 110 is approximately 11.5" long as measured between the proximal end 120 and the distal end 140. The outside diameter of the body 110, as measured in a cross sectional plane perpendicular to the longitudinal axis AA, is approximately 1.625". It should be understood that while certain dimensions of the disclosed embodiment are referenced herein, they are intended to illustrate the present invention and they are not intended to limit the present invention. A person having ordinary skill in the art and being familiar with this disclosure will understand that the components, as described herein, can have different sizes. It should also be noted that while reference is made to the terms proximal end and distal end throughout this disclosure, those terms are used to illustrate the present invention and are not, in any way, intended to limit the present invention. For example, although disclosed embodiment shows an opening 111 (discussed below) proximate to the proximal end 120, the present invention is not limited in this regard, and the opening may be proximate to the distal end 140.

The body 110 defines a cylindrical interior cavity 112 that extends a length along the axis AA from the proximal end 120 to the distal end 140. The inside diameter of the cylindrical cavity 112, as measured in a cross sectional plane perpendicular to the axis AA, is approximately 1.5". In the embodiment shown 100, the body 110 is made from aluminum. It should be understood, however, that the present invention is not limited in this regard, and that many different materials may used to form the body 110. The interior cavity 112 has an opening 111 at or proximate to the proximal end 120 of the body 110. The diameter of the opening 111 is similar to the inside diameter of the cavity 112 and is configured to receive the legs 160, 170, 180 of the base 150 when the legs are in the closed position. Although the body 110 is cylindrical in shape in the embodiment disclosed in the FIGS., the present invention in not limited in this regard, and the body may have many different shapes, for example the body may have a rectangular cross section. Similarly, the body 110 may comprise a substantially solid component, wherein the cavity for receiving the legs 160, 170, 180 is milled therein.

The body 110 includes a cap 142 coupled proximate to the distal end 140. The cap 142 includes a body support 144 attached thereto. The body support 144 is configured to support, at least in part, a body of a stringed instrument such as, for example, a guitar, received in the stand 100 when the stand 100 is in the open configuration. In one embodiment, the support 144 is generally cylindrical and extends along an axis that is substantially perpendicular to the axis AA. In the embodiment shown, the cap 142 is rotatably fixed relative to the body 110 about the axis AA. This allows for the support 144 to remain fixed in the proper position for supporting the body of a guitar when the stand 100 is in the open configuration. In the embodiment shown, the support 144 comprises a thermoplastic elastomer ("TPE"). A TPE is selected such that it inhibits scratching and/or staining of an outside surface of a body of an instrument received in the stand 100. It should be understood that although the support 144 is coupled to the cap 142 in the embodiment shown, the present invention is not limited in this regard, and the support, for example, may be coupled directly to the body 110 proximate to its distal end 140. Moreover, although the embodiment shown in the FIGS. includes a body support 144, the present invention is not limited in this regard, and, for example, the present invention may be practiced with a body 110 without a body support 144, or with a body 110 having a different type of body support 144. In another example, the present invention may be practiced wherein a body support is defined by the distal end 140 of the body 110 that is provided with a layer of TPE to protect an instrument received in the stand.

In reference to FIG. 3B, a view of the proximal end 120 of the body 110 and the connector 190 of the base 150 is shown 110. It should be noted that the portion of the body 110 shown in FIG. 3B is shown as a cross section while the connector 190 is not shown as a cross section. FIG. 3B illustrates the relationship between the different sets of threads 192, 196, 116. An inside surface 114 of the cavity 112 includes a plurality of female threads 116 at and proximate to the proximal end 120 of the body 110. The connector 190 extends along an axis CC between a proximal end 191 and a distal end 195. The connector 190 is approximately 1" in length between its proximal end 191 and its distal end 195. The connector 190 is substantially cylindrical and has an outside diameter such that the connector 190 can be received in the cavity 112 of the body 110.

Figure 6:
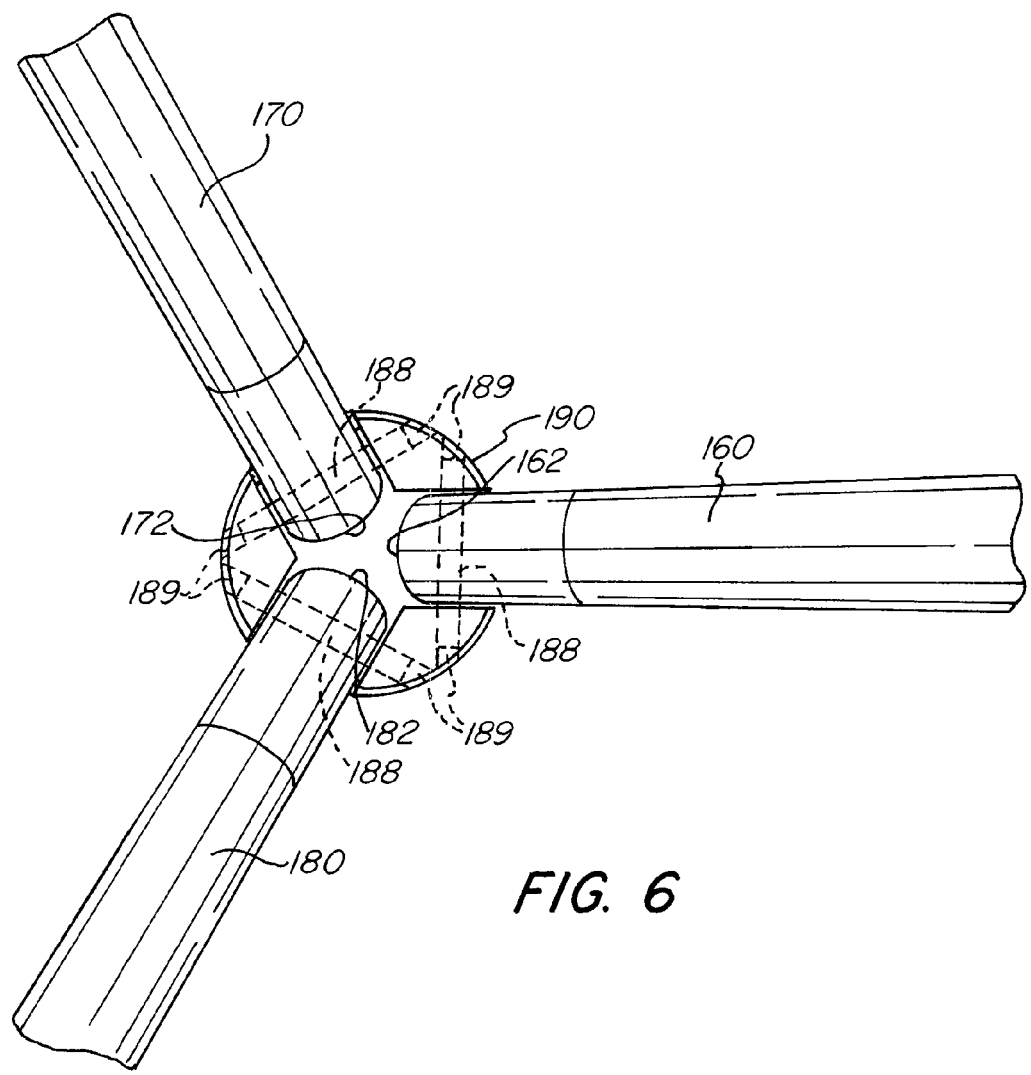
FIG. 6 is a bottom view of the stand shown in FIG. 4, wherein the legs are shown in the open position.

The connector 190 includes three recesses 197, 198, 199 (one shown in FIG. 3B, all three shown in FIG. 6). Each recess is configured to receive a proximal end 162, 172, 182 of one of the plurality of legs 160, 170, 180. For clarity of illustration, the legs 160, 170, 180 are not shown in FIG. 3B. The connector 190 includes a first set of male threads 192 at or proximate to the proximal end 191. The connector 190 includes a second set of male threads 196 at or proximate to the distal end 195. The second set of male threads 196 are configured so that they engage with the female threads 116 in the cavity 112 of the body 110 when the connector 190 is inserted distal end 195 first into to the opening 111 of the cavity 112. The connector 190 can be rotated relative to the body 110 about the axis AA to engage the male threads 196 with the female threads 116, thereby removably coupling the connector 190 to the body 110.

Similarly, the first set of male threads 192 are configured so that they engage with the female threads 116 in the cavity 112 of the body 110 when the connector 190 is inserted proximal end 191 first into the opening 111 of the cavity 112. The connector 190 can be rotated relative to the body 110 about the axis AA to engage the first set of male threads 192 with the female threads 116, thereby coupling the connector to the body. In this manner, it is possible to removably couple the base 150 with the body 110. It should be understood that when the second set of male threads 196 are engaged with the female threads 116, the legs 160, 170, 180 are received in the cavity 112 of the body 110 as shown in FIG. 2. When the first set of male threads 192 is engaged with the female threads 116, the plurality of legs 160, 170, 180 is outside of the cavity 112 of the body 110 as shown in FIG. 4.

As shown in FIG. 3B, the connector 190 includes a stop 194 between the first set of male threads 192 and the second set of male threads 196. The stop 194 extends along a circumference of the connector 190 and extends radially outward therefrom so that an outside diameter of the stop 194 is greater than the inside diameter of the cavity 112 of the body 110. When the connector 190 is received in the opening 111 and one of the first set of male threads 192 and the second set of male threads 196 is engaged with the female threads 116, the stop prevents the connector 190 from being over inserted into the cavity 112, thereby preventing the non-engaged set of male threads from becoming engaged with the female threads 116 in the wrong direction. It should be understood that although the disclosed embodiment employs a threaded connection between the connector 190 and the body 110, the present invention is not limited in this regard. A person of ordinary skill in the art and familiar with this disclosure will understand that many different methods of engaging the connector 190 with the body 110 may be used.

In reference to FIG. 2 and FIG. 3B, a cap 210 is provided. The cap 210 is configured so that is can be disposed on the proximal end 191 of the connector 190, thereby receiving the first set of male threads 192. An inside surface of the cap 210 and the first set of male threads 192 form an slight interference fit when the cap 210 is received on the first set of male threads 192. In this manner, the cap 210 will remain on the stand 100, but can be removed from the connector 190 by a person adjusting the stand 100 between the closed configuration and the open configuration. The cap 210 provides a smooth outer surface, as opposed to the surface of the first set of male threads 192, to be held by the hand of a person rotating the connector 190 relative to the body 110 to engage the connector 190 with the body 110. In reference to FIG. 2A, the connector 190 is shown received in the body 110 and the cap 210 is shown disposed on the proximal end 191 of the connector. In FIG. 2B, the connector 190 is removed from the body 110 and the cap 210 is removed from the proximal end 191 of the connector 190.

In reference to FIGS. 9A-9E different views of the connector 190 are shown to further illustrate the structure of the connector. In the views, the legs 160, 170, 180 have not been installed so as to better illustrate the connector 190. In FIGS. 9A-9E, holes 189 for receiving pins 188 (not shown) for coupling the legs 160, 170, 180 to the connector 190 are illustrated. The connector 190 includes a plurality of recesses 163, 173, 183 wherein each recess is configured to receive a proximal end 162, 172, 182 of one of the legs 160, 170, 180.

In reference to FIG. 6, a bottom view of a portion of the stand 100 is shown, in which the proximal ends 162, 172, 182 of the legs 160, 170, 180 are rotatably connected to the connector 190 via pins 188 received in the pin holes 189. In FIG. 6, the legs are shown in the open position. In some embodiments of the present invention, for example, that shown in FIG. 6, the extent of rotation of the legs 160, 170, 180 about the pin 188 is limited by a contact point between the connector 190 and a recess 163, 173, 183 in the connector configured to receive the proximal end 162, 172, 182 of each leg 160, 170, 180.

Figure 5:
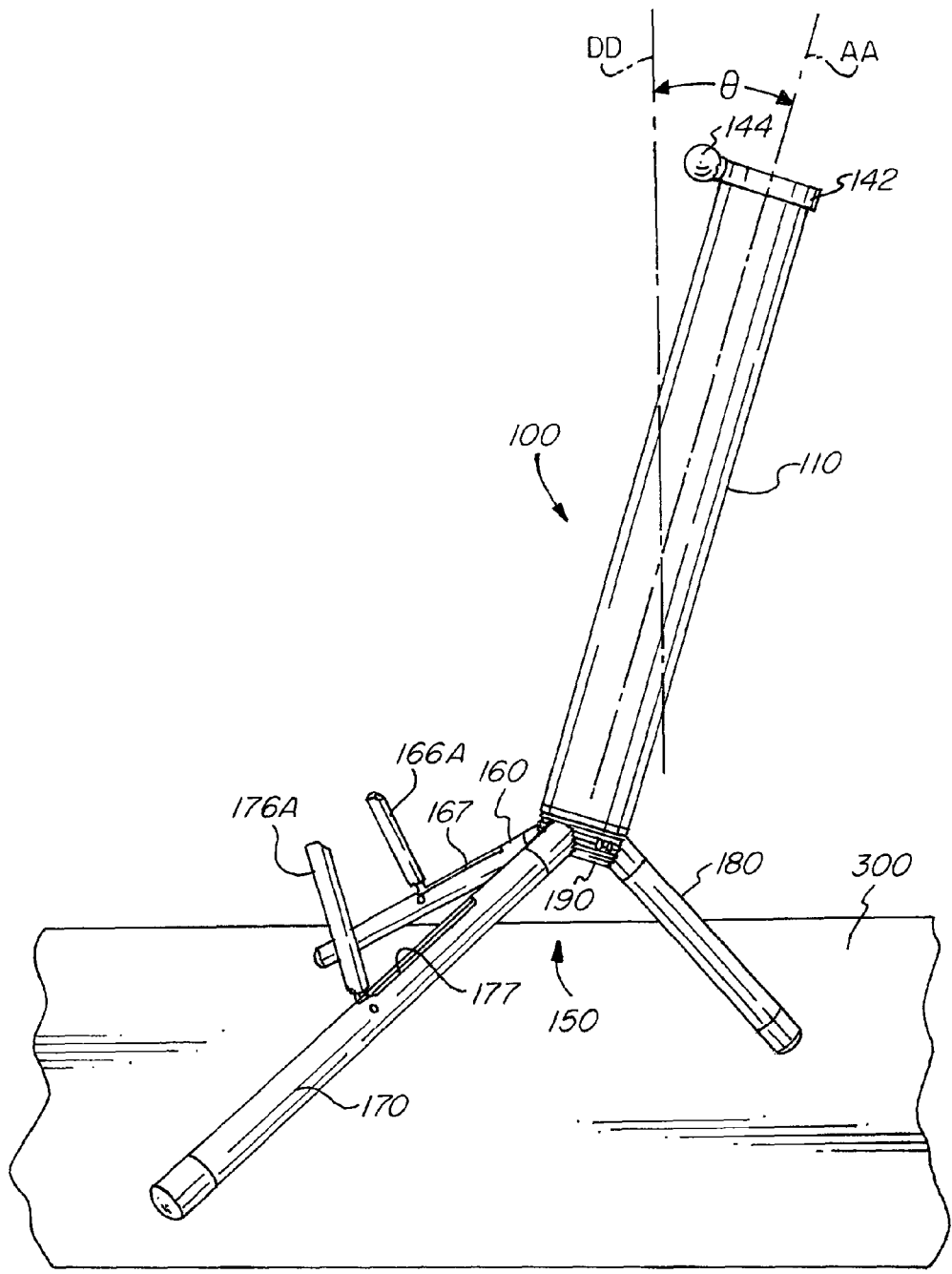
FIG. 5 is a side view of the stand shown in FIG. 4.

In FIGS. 4-6, the stand 100 is shown in the open configuration, wherein the first set of male threads 192 are engaged with the female threads 116, thereby coupling the body 110 to the base 150 and the legs 160, 170, 180 are in the open position to support the stand 100 on a flat surface 300 (shown in FIG. 5). In this open configuration, the stand 100 is configured to receive and support a stringed instrument such as a guitar.

The base 150 includes the connector 190, described above, and the first leg 160, the second leg 170, and the third leg 180. Each leg 160, 170, 180 includes a proximal end 162, 172, 182 and a distal end 164, 174, 184. The proximal end 162, 172, 182 of each leg 160, 170, 180 is coupled to the connector by a pin 188 or some other means to permit rotation between the open and the closed positions. In reference to FIG. 6, the connector 190 includes three recesses 163, 173, 183. Each recess 163, 173, 183 is configured to receive a proximal end 162, 172, 182 of one of the plurality of legs 160, 170, 180. The proximal end 162, 172, 182 of each leg 160, 170, 180 is coupled within the respective recess 163, 173, 183 of the connector 190 so that the leg 160, 170, 180 can move (e.g., rotate) between an open position, as shown in FIGS. 4-6, and a closed position, as shown in FIG. 3A. The connector 190, and more specifically, the recesses 163, 173, 183 are configured to limit or bound maximum rotation into the open position of each leg 160, 170, 180 so that when in the open position the legs 160, 170, 180 define a tripod position and support the stand 100 such that it is capable of receiving and supporting and instrument. In the embodiment shown, the recesses 163, 173, 183 are formed in the connector 190 by, for example, a CNC machine. In reference to FIGS. 9A-9E, the size and configuration of the recesses is illustrated. The recesses 163, 173, 183 are sized so that they allow the pinned leg 160, 170, 180 to rotate until the maxim extent is reached.

In reference to FIG. 5, the stand 100 is shown on a table 300 or other support surface in the open configuration. The first leg 160 and the second leg 170 include a first leg support 166A and a second leg support 176A, respectively. The leg supports 166A, 176A are moveable between an open position (FIG. 5), wherein they are configured to support the edge of a guitar body and are substantially perpendicular with the leg, and a closed position (FIG. 3A), wherein they are substantially flush with the remaining portions of the leg 160, 170, thereby enabling the legs 160, 170, 180 to be moved to the closed position and inserted into the cavity 112 of the body 110.

Figure 7:
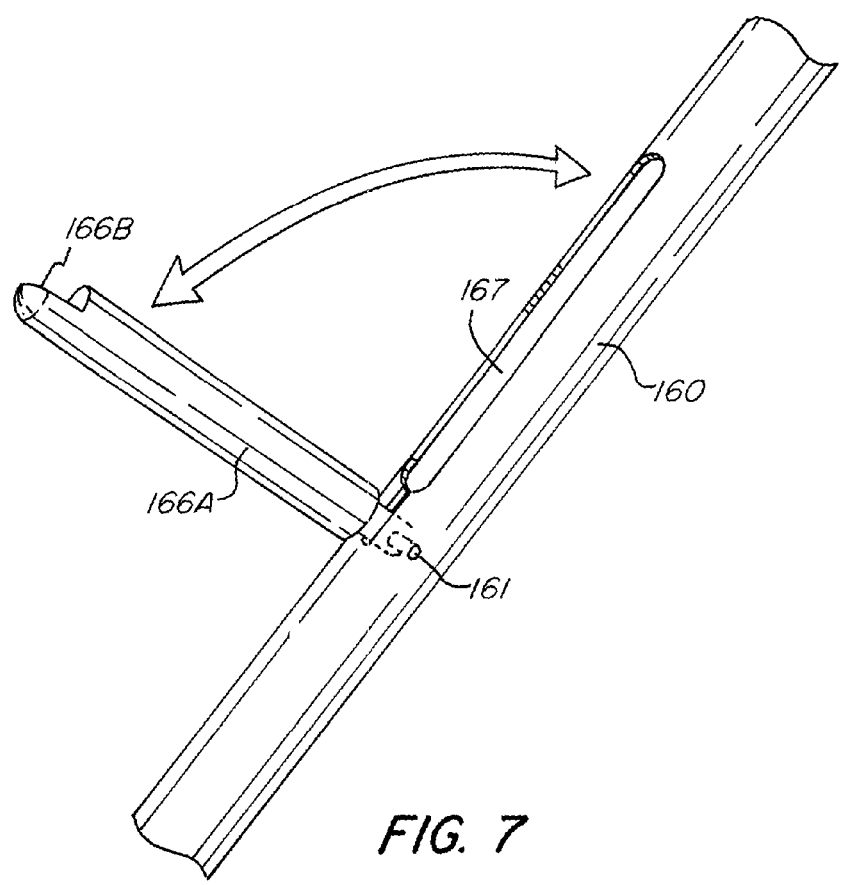
FIG. 7 is a side view of a leg of the stand in accordance with the present invention, wherein a leg support is shown in the open position.

In reference to FIG. 7, the first leg 160 is shown with the first leg support 166 in the open position. A proximal end 166B of the first leg support 166A is rotatably connected to the leg 160 via a pin 161 to the first leg 160 such that the first leg support 166A can rotate about the pin between a closed position, where the first leg support 166A is disposed in, for example, a recess 167 of the first leg 160, and an open position, where the first leg support 166A extends outwardly from the first leg 160, for example perpendicular from the first leg 160 as shown in FIG. 7. In one embodiment, the distal end 166B of the first leg support 166A is narrower than the remaining portion of the first leg support 166A to facilitate opening the first leg support 166A when it is in the closed position and substantially flush with the remaining portion of the first leg 160, as shown in FIG. 3. It should be appreciated that the second leg support 176A of the second leg 170 may be similarly configured for movement, e.g., rotation, between a closed and an open position.

Figure 8A:
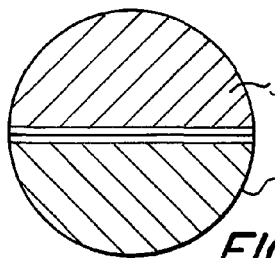
FIGS. 8A-8C show two cross sectional views and a side view of one embodiment of a support leg in accordance with the present invention.
Figure 8C:
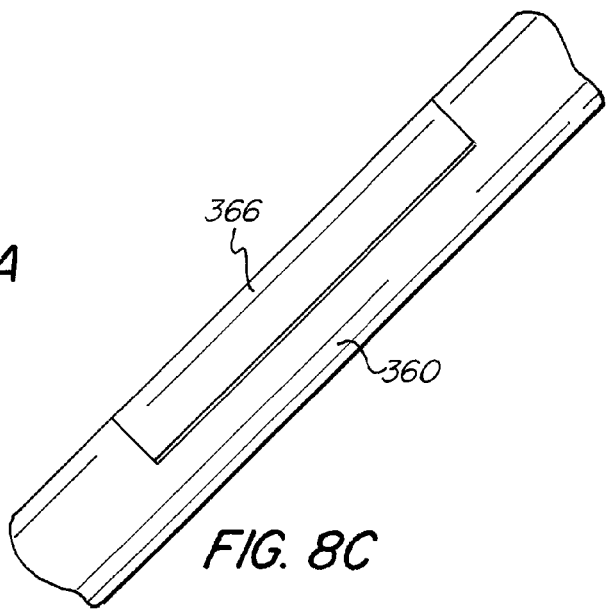
Figure 8B:
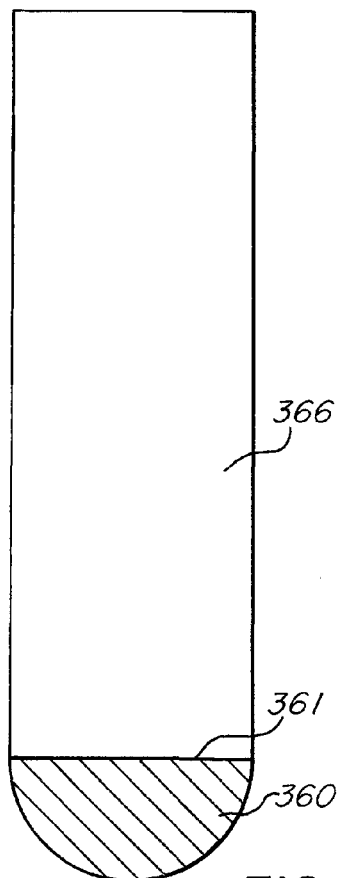
Figure 9A:
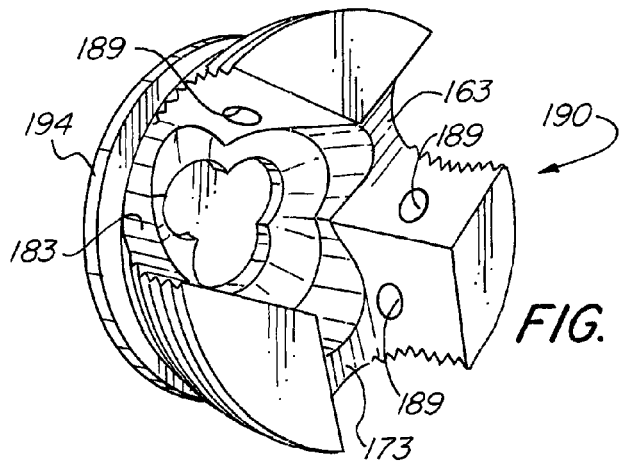
FIGS. 9A-9E show different views of a connector in accordance with one embodiment of the present invention, wherein the legs have been removed to illustrate the structure of the connector.
Figure 9B:
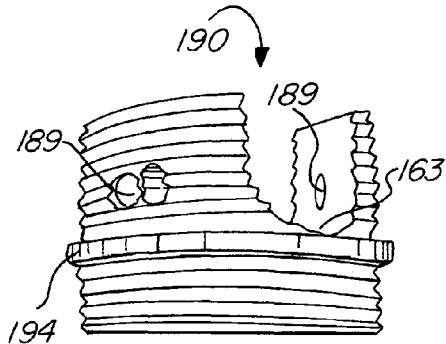
Figure 9C:
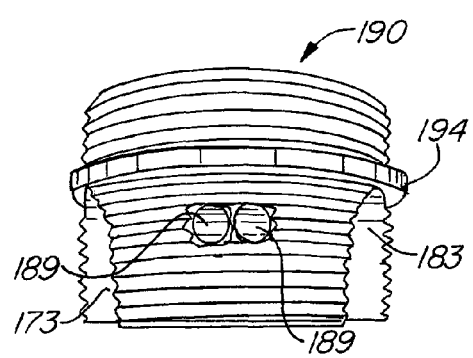
Figure 9D:
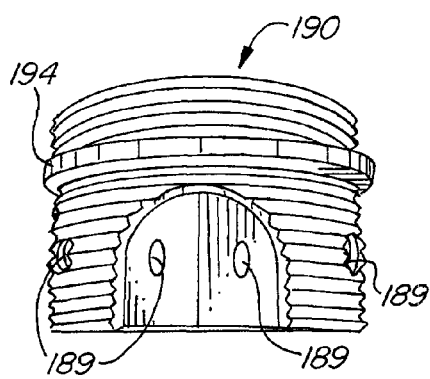
Figure 9E:
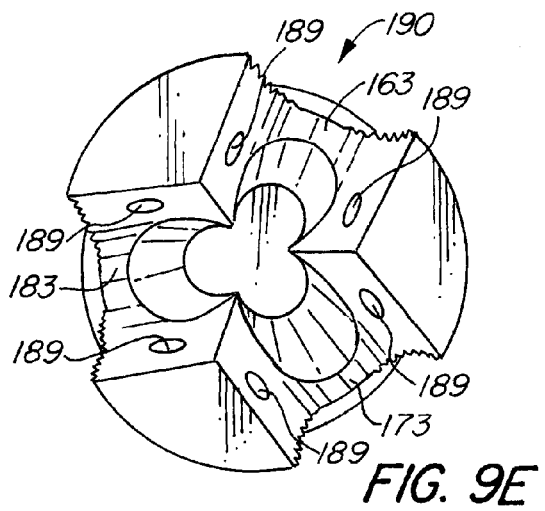

In reference to FIG. 8A-8C an alternative embodiment for a leg 360 and a first leg support 366 is illustrated. The leg support 366 is moveable between an open position (FIG. 8B), wherein it is configured to support the edge of a guitar body and is substantially perpendicular with the leg, and a closed position (FIG. 8A), wherein the leg support 366 is substantially flush with the remaining portions of the leg 360. In reference to FIG. 8A, a cross section of the leg 360 and leg support 366 are shown. The leg support 366 is approximately half of the cross section, i.e. a semi-circle. As a result, and a shown in FIG. 8B, a flat support surface 361 is provided in the leg 360. A side view of this configuration is shown in FIG. 8C. It should be understood that although one or more specific configurations of the leg and leg supports is shown, the present invention is not limited in this regard and other configurations may be employed.

In the embodiment shown in FIGS. 2-9, the first leg 160 and the second leg 170 are similar in length, while the third leg 180 is substantially shorter. The legs 160, 170, 180 and the connector 190, and recesses therein 163, 173, 183, are configured so that the stand 100 can support a guitar when it is in the open configuration. In reference to FIG. 5, when the stand 100 is in the open configuration, the axis AA of the body 110 is approximately 15 degrees past a vertical axis DD as is illustrated by the reference ⊖ in FIG. 5. As shown in FIG. 4, when the stand 100 is in the open configuration, the axis BB along which the body support 144 extends is substantially parallel with an axis EE passing through the proximal end 166C of the first leg support 166A and a proximal end 176C of the second leg support 176A. In this manner, the open configuration of the stand 100 can receive and support a guitar. The edge of the body of the guitar is supported by the first leg 160 and the first leg support 166A and by the second leg 170 and the second leg support 176A. The body of the guitar, and specifically the back, is further supported by body support 144. When the guitar is properly received in the stand 100, the neck of the guitar extends along an axis parallel to axis AA. This configuration provides for a sturdy support that inhibits the stand 100 and/or the guitar from being tipped over, even if one or more of the guitar and the stand 100 are bumped.

In further reference to FIGS. 2-9, the first and the second legs 160, 170 are approximately 9.5" in length, while the third leg 180 is approximately 5.25" in length. It should be understood by a person having ordinary skill in the art and familiar with this disclosure, that the legs 160, 170, 180 can have different lengths and configurations. In the disclosed embodiments, the legs 160, 170, 180 are made from aluminum. Each leg includes a cap made from TPE at its distal end 164, 174, 184 so as to inhibit the stand 100 from scratching a surface, for example, a wood floor. Similarly, the first leg support 166A and the second leg support 176A and the areas of the first and second leg proximate thereto, have TPE coverings to protect the body of the guitar from being scratched when the guitar is received in the stand 100.

When the stand 100 is in the closed configuration, as shown in FIG. 2, the legs 160, 170, 180 are folded inwardly so that they extend along the axis AA, and the legs are received in the interior cavity 112 of the body 110. In this manner, the stand 100 is compact and can be received in a guitar case, brief case, or back pack, for example, and can easily be carried by one person. The stand 100 can subsequently be moved to the open configuration to provide a sturdy and secure stand 100 for supporting a guitar.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A guitar stand moveable between an open configuration and a closed configuration, comprising:
    a body extending along an axis AA between a proximal end and a distal end, the body defining a cavity extending through at least a portion thereof and having an opening proximate to the proximal end;
    a base having a connector and a plurality of legs extending therefrom, each of the plurality of legs extending between a proximal end and a distal end, the proximal end of each of the plurality of legs being rotatably connected to the connector, the plurality of legs being rotatable between a closed position, in which an axis of each of the plurality of legs is substantially parallel, and an open configuration;
    a first set of male threads on an outside surface of the connector, a first set of female threads on an inside surface of the cavity, the first set of male threads being engageable with the first set of female threads to removably secure the connector to the body when the stand is in the closed configuration;
    a second set of male threads on the outside surface of the connector, the second set of male threads being engageable with the first set of female threads to removably secure the connector to the body when the stand is in the closed configuration;
    wherein when the stand is in a closed configuration the plurality of legs are in the closed position and received in the cavity and the connector is removably secured to the body; and
    wherein when the stand is in an open configuration, the plurality of legs are in the open position and the connector is removably secured to the body such that the plurality of legs are outside of the cavity and such that the body is positioned to receive and support at least a portion of a guitar.

2. The stand of claim 1, wherein the plurality of legs comprises a first leg, a second leg, and a third leg; and
    wherein the plurality of legs form a tripod when the stand is in the open configuration.

3. The stand of claim 2, wherein the first leg includes a first leg support rotatably connected thereto and moveable between an open position and a closed position, and wherein the second leg includes a second leg support rotatably connected thereto and moveable between an open position and a closed position.

4. The stand of claim 3, wherein the first leg support and the second leg support are configured to support at least in part a guitar when the stand is in the open configuration and the first leg support is in the open position and the second leg support is in the open position.

5. The stand of claim 1, wherein the body further comprises a body support secured to the distal end of the body, wherein the body support is configured to support a guitar when the stand is in the open configuration.

6. The stand of claim 1, wherein the axis AA is between approximately 10 and 20 degrees past a vertical axis DD when the stand is in the open configuration and is resting on a flat surface, the vertical axis DD being perpendicular to the flat surface.

7. The stand of claim 5, wherein the plurality of legs comprises a first leg, a second leg, and a third leg; and wherein the first leg includes a first leg support rotatably connected thereto and moveable between an open position and a closed position, the second leg includes a second leg support rotatably connected thereto and moveable between an open position and a closed position; and wherein the body support extends along an axis BB, an axis EE passes through a proximal end of the first leg support and a proximal end of the second leg support, and the axis BB is parallel to the axis EE when the stand is in the open configuration.

8. The stand of claim 1, further comprising a cap configured to be received on the second set of male threads when the stand is in the closed configuration.

* * * * *